US 7,043,625 B2

(12) United States Patent
Rosin et al.

(10) Patent No.: US 7,043,625 B2
(45) Date of Patent: May 9, 2006

(54) METHOD AND APPARATUS FOR ADDING USER-DEFINED EXECUTION UNITS TO A PROCESSOR USING CONFIGURABLE LONG INSTRUCTION WORD (CLIW)

(75) Inventors: Eyal Rosin, Rosh Haain (IL); Regis Hervigo, Vence (FR); Haim Granot, Bat Hefer (IL)

(73) Assignee: Infineon Technologies AG, Munich (DE)

( * ) Notice: Subject to any disclaimer, the term of this patent is extended or adjusted under 35 U.S.C. 154(b) by 564 days.

(21) Appl. No.: 09/809,053

(22) Filed: Mar. 16, 2001

(65) Prior Publication Data

US 2001/0037441 A1 Nov. 1, 2001

Related U.S. Application Data

(60) Provisional application No. 60/192,403, filed on Mar. 27, 2000.

(51) Int. Cl.
*G06F 9/38* (2006.01)

(52) U.S. Cl. .............................. 712/24; 712/34; 712/35
(58) Field of Classification Search .................. 712/24, 712/34, 35
See application file for complete search history.

(56) References Cited

U.S. PATENT DOCUMENTS 6,023,757 A * 2/2000 Nishimoto et al. ......... 712/209
6,026,478 A    2/2000 Dowling
6,467,036 B1 * 10/2002 Pechanek et al. ............. 712/24

FOREIGN PATENT DOCUMENTS

JP  09-212358   8/1996
WO  WO 99/42922  8/1999

OTHER PUBLICATIONS

U.S. Appl. No. 09/247,686, filed Feb. 1999, Rosin et al.
*The proceedings of the 8th International Conference on Signal Processing Applications & Technology*, pp. 838-842, Sep. 1997, Miller Freeman Inc, San Fransisco CA
TMS320C62xx CPU and Instruction Set, Jul. 1997 Texas Instruments Inc. Houston, Texas.

(Continued)

*Primary Examiner*—William M. Treat
(74) *Attorney, Agent, or Firm*—Mark M. Friedman

(57) ABSTRACT

The present invention is a system in which a multiplicity of diverse dedicated hardware off-core execution units are connected to a core processor in order to increase the speed, power, and flexibility of the processor, and a method of operating the system. Reference instructions executed by the core processor initiate the execution of Configurable Long Instruction Word (CLIW) instructions stored in a CLIW memory. The operation of the off-core execution units is controlled by CLIW instructions. These CLIW instructions may also control operations performed by the core processor, and may be in addition to any other CLIW instructions that control the core processor exclusively. The off-core logic units are operationally connected to the data memory of the core processor under the control of the core processor's data address logic. The use of CLIW technology for the control of the off-core hardware logic units allows the addition of a plurality of diverse off-core logic units without affecting the instruction set, coding space, or instruction decoders of the core processor.

14 Claims, 2 Drawing Sheets

OTHER PUBLICATIONS

"*DSP Processor Fundamentals—Architectures and Features*" by Lapsley et al Berkeley Design Technology Inc.

PCT 1PER for PCT/US01/08583 dated May 8, 2002.
PCT Search Report for PCT/US01/08583 dated Jun 8, 2001.

* cited by examiner

METHOD AND APPARATUS FOR ADDING USER-DEFINED EXECUTION UNITS TO A PROCESSOR USING CONFIGURABLE LONG INSTRUCTION WORD (CLIW)

This appln claims benefit of 60/192,403, filed Mar. 27, 2000.

FIELD AND BACKGROUND OF THE INVENTION

Data processors, including specialized data processors such as Digital Signal Processors (DSPs), are commonly used in devices such as cellular telephones, modems, set-top boxes, digital communications equipment in general, music and video equipment, voice and image recognition equipment, and many other systems. These devices may perform arithmetically intensive tasks and may be required to operate according to strict real-time constraints. The heart of any DSP is the execution unit. The execution unit of a DSP is often highly specialized, designed to perform the types of computation common in DSP applications. Nevertheless, no one data processor has yet met the needs of all or even most applications. When available data processors do not meet system requirements, the following alternatives are currently available:

1. Add dedicated hardware to the system in order to perform the required functions. This hardware-intensive solution is less flexible, and more difficult to maintain, than software solutions.

2. Modify the data processor to include additional execution units (e.g. multiply-accumulate units or Galois field multipliers). This solution is (a) less efficient (i.e. it may require a larger circuit area) for those applications that may not require the additional functions; and (b) a costly and time-consuming process that involves adding new functions, creating new instructions, and modifying other parts of the core processor (e.g. the core processor's instruction decoder).

3. Add a loosely-coupled co-processor, such as a member of Intel's x87 family of numeric co-processors, to assist in performing additional computation. Co-processors that are not tightly coupled with the core must receive a program and the co-processors need a "start" instruction in order to be activated. When co-processors are finished executing, the co-processors synchronize with the core by means such as an interrupt. The core processor and the co-processors may spend significant amounts of time idling while waiting for each others' synchronization signals.

4. Offer a processor that can be configured by ASIC developers. These processors have a fixed selection of hardware resources (such as ALU, multiplier, data paths, etc.) and instructions. To this baseline architecture, a number of new instructions can be added. The flexibility of these chips is limited in terms of the changes that can be made.

5. Add tightly coupled co-processors using a special field in the instruction coding. This field is added to the instructions of the core processor and is passed to the off-core units in order to control these off-core units. This approach has the disadvantages of: (a) limited, and fixed in advance, co-processor support; and (b) sacrifice of a large portion of the instruction coding space, which can increase overall code size even if the application has no need for the co-processor.

There is thus a widely recognized need for, and it would be highly advantageous to have, off-core execution units, or similarly, off-core logic units, which allow the execution unit of a processor to be customized without changes to the instruction set or the core processor itself. Additionally, it would be highly advantageous to have a very flexible solution that allows the user to tailor the core processor to the application without compromising code size, scalability, and overall system parameters.

SUMMARY OF THE INVENTION

FIG. 1 depicts the general principle of the present invention. External off-core processing units 54 are connected to a core processor 50 in an interchangeable and selectable manner by means of an interface 52. This interchangeable selection of off-core processing units allows the core processor to be enhanced in processing power, speed, and flexibility in accordance with the needs of a particular application.

Off-core logic units can be added without modifying the core processor's instruction set by means of the Configurable Long Instruction Word (CLIW) technology described in co-pending U.S. patent application Ser. No. 09/247,686, entitled "Configurable Long Instruction Word Architecture and Instruction Set", which is incorporated by reference for all purposes as if fully set forth herein. CLIW instructions are custom meta-instructions that allow the modification of the set of instructions that a processor can execute without impinging on the instruction space of the core processor.

The exclusive use of CLIW instructions to control the operation of the off-core execution units has the advantage of allowing the addition of one or more off-core execution units of varying designs, which may not have even been conceived at the time of the design of the core processor, without requiring modification of the core processor, its instruction decoder, or its instruction set, since the control signals used to control the off-core execution units are derived from the CLIW memory, and sent to the off-core execution units via the off-core-execution-unit interface.

The CLIW instructions, also known as re-useable blocks, used to control the operation of any particular configuration of off-core execution units can be developed separately from the instruction set of the core processor, and without affecting the software of other configurations. In addition, a processor configuration that includes off-core execution units controlled exclusively by CLIW instructions can run software written for the core processor alone, as well as software written for processors including only a subset of the off-core execution units included in the processor, provided that the subset of processors are located at corresponding off-core-execution-unit-interface ports.

A high-speed data processor may use multiple data buses and multi-port data memories to allow access to more than one data value in any one processor cycle. In the present invention, the logic signals used to control data access, including those used to allow access to multiple buses, as well as the data buses themselves, are made available to the off-core execution units. Reference instructions that invoke CLIW instructions can specify data operands to be read and written. Data operand addressing information contained in reference instructions can be processed in the same manner as data operand addressing information contained in ordinary core processor instruction. This data operand information processing can take place simultaneously with the retrieval of the CLIW instruction from the CLIW memory, and any necessary decoding of the CLIW instruction. The ability of off-core execution units to access operands in the same manner as the core processor is advantageous because it speeds execution and reduces the complexity of programming compared to other methods, such as placing operands in particular registers, since it avoids the overhead that would be involved in special treatment of operands for instructions executed by the off-core execution units.

Therefore, according to the present invention there is provided a data processor including: (a) at least one off-core execution unit; (b) a CLIW memory for storing at least one Configurable Long Instruction Word (CLIW) instruction; and (c) a core processor operative to retrieve the at least one CLIW instruction from the CLIW memory and forward at least a respective portion of the at least one CLIW instruction to at least one of the at least one off-core execution units.

Preferably, the core processor is operative to execute a plurality of instructions of an instruction set, and the instruction set includes a Reference Instruction for initiating retrieval and execution of the CLIW instruction.

Preferably, the data processor further includes (d) a Data Memory; and (e) a Data Address Logic system, the Data Address Logic system operative to control access to the Data Memory by the core processor, the Data Address Logic system also operative to control access to the Data Memory by the at least one off-core execution unit.

Preferably, the core processor is operative to retrieve the CLIW instruction from the CLIW memory, and the Data Address Logic system is operative to control access to the Data Memory by the core processor and to the Data Memory by the at least one off-core execution unit, substantially simultaneously.

Preferably, the data processor further includes: (f) a CLIW instruction decoder, wherein the CLIW instruction decoder is operative to decode the CLIW instruction, and the Data Address Logic system is operative to control access to the Data Memory by the core processor and to the Data Memory by the at least one off-core execution unit, substantially simultaneously.

Also according to the present invention there is provided a method for processing data including the steps of: (a) providing an off-core execution unit; (b) providing a core processor; and (c) executing a CLIW instruction to process the data, by both the core processor and the off-core execution unit.

Preferably, the off-core execution unit executes only a respective portion of the CLIW instruction and the core processor executes a remainder of the CLIW instruction. Most preferably, the off-core execution unit executes only its respective portion of the CLIW instruction.

Preferably, the method further includes the steps of: (d) providing a CLIW memory; (e) storing the CLIW instruction in the CLIW memory; (f) retrieving the CLIW instruction from the CLIW memory, by the core processor; and (g) forwarding the respective portion of the CLIW instruction to the off-core execution unit, by the core processor, prior to the execution of the respective portion of the CLIW instruction by the off-core execution unit.

Preferably, the off-core execution unit executes the respective portion of the CLIW instruction simultaneously with execution by the core processor of the remainder of the CLIW instruction.

Preferably, the method further includes the step of: (h) issuing a reference instruction, by the core processor, to initiate the retrieving and executing of the CLIW instruction.

Preferably, the method further includes the steps of: (i) providing a data memory; (j) providing a data address logic system for controlling access to the data memory by the core processor and to the data memory by the off-core execution unit; and (k) addressing data by the off-core execution unit and addressing data by the core processor under control of the data address logic system.

Preferably, the retrieving of the CLIW instruction from the CLIW memory is simultaneous with the addressing of data by the off-core execution unit and the addressing of data by the core processor.

Preferably, the method further includes the step of: (l) decoding the CLIW instruction, wherein the decoding of the CLIW instruction is simultaneous with the addressing of data by the off-core execution unit and the addressing of data by the core processor.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a method of adding off-core logic units to a core processor, and the apparatus thereby produced. These off-core logic units can work simultaneously with other on-core and off-core execution units in a very flexible manner. Specifically, the present invention increases processor speed, power and flexibility by adding off-core logic units to a processor's core without compromising code size, scalability, and overall system parameters.

The principles and operation of off-core logic units, according to the present invention, may be better understood with reference to the drawings and the accompanying description.

Figure 1:
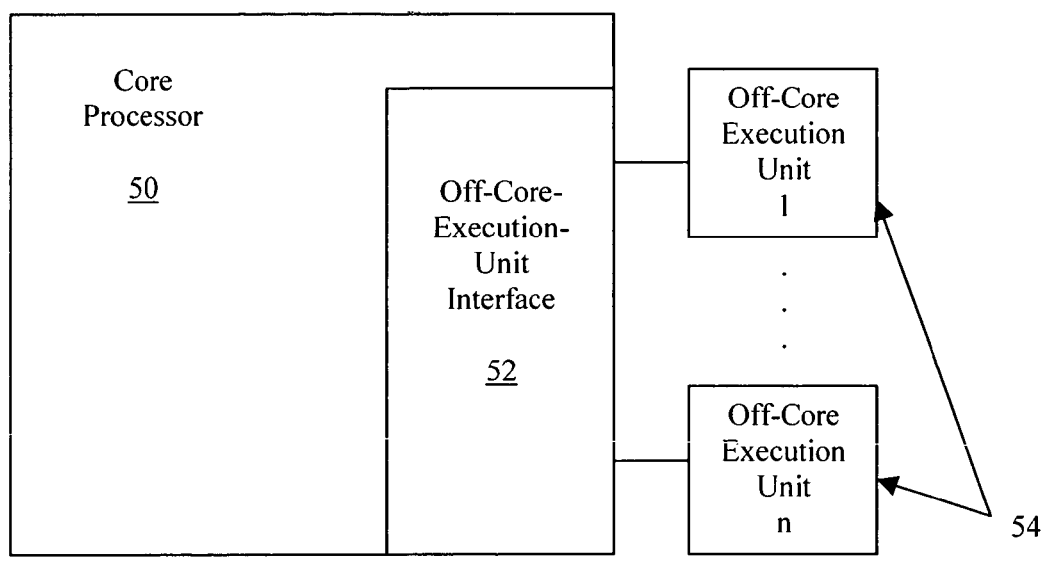
FIG. 1 shows how the off-core execution units add to and enhance the core processor according to the present invention.

FIG. 1 illustrates the general principle of the present invention. External logic units 54 are connected to core processor 50 in an interchangeable and selectable manner. This interchangeable selection allows the core processor to be enhanced in processing power, speed and flexibility in accordance with the needs of a particular design.

Figure 2:
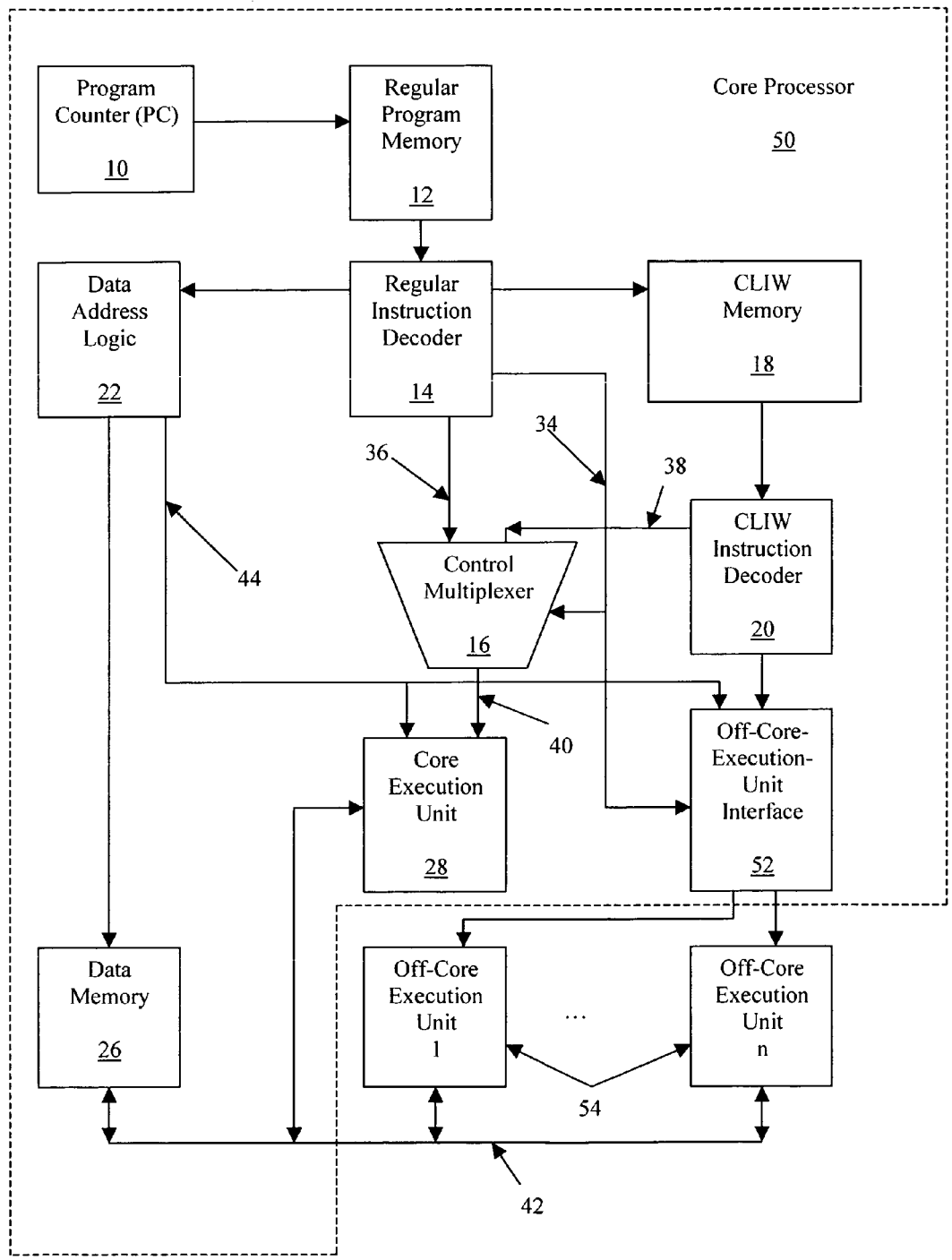
FIG. 2 is a block diagram of a processor system using CLIW and connected to off-core execution units according to the present invention.

Refer now to FIG. 2. CLIW instructions are invoked by means of reference instructions. The reference instruction is a regular instruction in the instruction set of core processor 50 which has the function of invoking CLIW instructions. The operation code portion of the reference instruction indicates to a regular instruction decoder 14 of the core processor that a CLIW instruction is to be processed. CLIW signal line 34 is set by regular instruction decoder 14 in accordance with whether the core processor instruction currently being processed is a regular instruction or a reference instruction. If the core processor instruction currently being processed is not a reference instruction, CLIW signal line 34 is cleared by regular instruction decoder 14, so that output 40 of control multiplexer 16 is driven by output 36 of regular instruction decoder 14, allowing normal processing of the instruction. However, if the core processor instruction currently being processed is a reference instruction, regular instruction decoder 14 passes to a CLIW memory 18 a portion of the reference instruction containing a pointer to the appropriate CLIW instruction contained in CLIW memory 18. CLIW memory 18 is operative to send this CLIW instruction to a CLIW instruction decoder 20, and CLIW signal line 34 is set by regular instruction decoder 14 so that output 40 of control multiplexer 16 is driven by output 38 of CLIW instruction decoder 20. CLIW signal line 34 also activates an off-core-execution-unit interface 52, causing off-core-execution-unit interface 52 to accept the portions of the decoded CLIW instruction relevant to off-core execution units 54 and pass them to off-core execution units 54 for execution.

For both regular and reference core processor instructions, the data operand address portion of the instruction is passed to data address logic 22. Data address logic 22 is operative to control data memory 26, in accordance with the data operand address portion of the instruction, so as to transfer data values, that are to be read by core execution unit 28 and off-core execution units 54, from data memory 26 to one or more data buses 42. Data address logic 22 is also operative to transfer data values, that are written to data buses 42 by core execution unit 28 and off-core execution units 54, to data memory 26. Data address logic 22 is further operative to transfer, via memory operand tag lines 44, signals indicating to core execution unit 28 and off-core execution units 54 which of data buses 42 each data item is to be read from or written to.

The present invention lets system designers add off-core logic units without modifying the regular instruction set of the core processor. This easy addition is possible due to the Configurable Long Instruction Word (CLIW) technology described in co-pending U.S. patent application Ser. No. 09/247,686. CLIW instructions are custom super-instructions that use multiple standard instructions as building blocks.

While the invention has been described with respect to a limited number of embodiments, it will be appreciated that many variations, modifications and other applications of the invention may be made.

What is claimed is:

1. A data processor comprising:
 a) at least one off-core execution unit;
 b) a CLIW memory for storing at least one Configurable Long Instruction Word (CLIW) instruction; and
 c) a core processor operative to retrieve said at least one CLIW instruction from said CLIW memory and forward at least a respective portion of said at least one CLIW instruction to at least one of said at least one off-core execution units;
 wherein each said off-core execution unit is an external off-core processing unit connected to said core processor in an interchangeable and selectable manner by means of an interface.

2. The data processor of claim 1, wherein said core processor is operative to execute a plurality of instructions of an instruction set, and wherein said instruction set includes a Reference Instruction for initiating retrieval and execution of said CLIW instruction.

3. The data processor of claim 1, further comprising:
 d) a Data Memory; and
 e) a Data Address Logic system,
 said Data Address Logic system operative to control access to said Data Memory by said core processor, said Data Address Logic system also operative to control access to said Data Memory by said at least one off-core execution unit.

4. The data processor of claim 3, wherein said core processor is operative to retrieve said CLIW instruction from said CLIW memory, and said Data Address Logic system is operative to control access to said Data Memory by said core processor and to said Data Memory by said at least one off-core execution unit, substantially simultaneously.

5. The data processor of claim 3, further comprising:
 f) a CLIW instruction decoder,
 wherein said CLIW instruction decoder is operative to decode said CLIW instruction, and said Data Address Logic system is operative to control access to said Data Memory by said core processor and to said Data Memory by said at least one off-core execution unit, substantially simultaneously.

6. A method for processing data comprising the steps of:
 a) providing a core processor;
 b) providing an off-core execution unit that is an external off-core processing unit connected to said core processor in an interchangeable and selectable manner by means of an interface; and
 c) executing a CLIW instruction to process the data, by both said core processor and said off-core execution unit.

7. The method of claim 6, wherein said off-core execution unit executes a respective portion of said CLIW instruction and said core processor executes a remainder of said CLIW instruction.

8. The method of claim 7, wherein said off-core execution unit executes only said respective portion of said CLIW instruction.

9. The method of claim 7, wherein said off-core execution unit executes said respective portion of said CLIW instruction simultaneously with execution by said core processor of said remainder of said CLIW instruction.

10. The method of claim 7, further comprising the steps of:
 d) providing a CLIW memory;
 e) storing said CLIW instruction in said CLIW memory;
 f) retrieving said CLIW instruction from said CLIW memory, by said core processor; and
 g) forwarding said respective portion of said CLIW instruction to said off-core execution unit, by said core processor, prior to said execution of said respective portion of said CLIW instruction by said off-core execution unit.

11. The method of claim 10, further comprising the step of:
 h) issuing a reference instruction, by said core processor, to initiate said retrieving and executing of said CLIW instruction.

12. The method of claim 6, further comprising the steps of:
 d) providing a data memory;
 e) providing a data address logic system for controlling access to said data memory by said core processor and to said data memory by said off-core execution unit; and
 f) addressing data by said off-core execution unit and addressing data by said core processor under control of said data address logic system.

13. The method of claim 10, further comprising the steps of:
 h) providing a data memory;
 i) providing a data address logic system for controlling access to said data memory by said core processor and to said data memory by said off-core execution unit; and
 j) addressing data by said off-core execution unit and addressing data by said core processor under control of said data address logic system;
 and wherein said retrieving of said CLIW instruction from said CLIW memory is simultaneous with said addressing of data by said off-core execution unit and said addressing of data by said core processor.

14. The method of claim 13, further comprising the step of:
k) decoding said CLIW instruction, and wherein said decoding of said CLIW instruction is simultaneous with said addressing of data by said off-core execution unit and said addressing of data by said core processor.

* * * * *